US012806930B2

(12) United States Patent
Son et al.

(10) Patent No.: US 12,806,930 B2
(45) Date of Patent: Nov. 24, 2026

(54) NOZZLE INSPECTION METHOD, NOZZLE INSPECTION APPARATUS, AND SUBSTRATE PROCESSING DEVICE

(71) Applicant: SEMES CO., LTD., Chungcheongnam-do (KR)

(72) Inventors: Sang Uk Son, Suwon-si (KR); Yong Tak Hyun, Seoul (KR)

(73) Assignee: SEMES CO., LTD., Chungcheongnam-Do (KR)

(*) Notice: Subject to any disclaimer, the term of this patent is extended or adjusted under 35 U.S.C. 154(b) by 361 days.

(21) Appl. No.: 18/395,349

(22) Filed: Dec. 22, 2023

(65) Prior Publication Data

US 2024/0262116 A1 Aug. 8, 2024

(30) Foreign Application Priority Data

Feb. 8, 2023 (KR) ........................ 10-2023-0016788

(51) Int. Cl.

| | |
|---|---|
| ***B41J 2/045*** | (2006.01) |
| ***B41J 2/135*** | (2006.01) |
| ***B41J 2/165*** | (2006.01) |
| ***B41J 29/393*** | (2006.01) |

(52) U.S. Cl.

CPC ........... *B41J 29/393* (2013.01); *B41J 2/0451* (2013.01); *B41J 2/04586* (2013.01); *B41J 2/16579* (2013.01); *B41J 2029/3935* (2013.01)

(58) Field of Classification Search

CPC .... B41J 29/393; B41J 2/0451; B41J 2/04586; B41J 2/16579; B41J 2029/3935; B41J 2/135; B41J 2/2142

See application file for complete search history.

(56) References Cited

U.S. PATENT DOCUMENTS

| | | | | |
|---|---|---|---|---|
| 2006/0146077 | A1 | 7/2006 | Song et al. | |
| 2006/0214976 | A1* | 9/2006 | Iwao | B41J 29/393 347/19 |
| 2023/0066695 | A1* | 3/2023 | Son | B41J 2/0451 |

FOREIGN PATENT DOCUMENTS

| | | |
|---|---|---|
| KR | 10-2006-0077632 | 7/2006 |
| KR | 10-2010-0135392 | 12/2010 |
| KR | 10-2017-0060383 | 6/2017 |
| KR | 10-2021-0063535 | 6/2021 |
| KR | 10-2023-0029221 | 3/2023 |

* cited by examiner

*Primary Examiner* — Jason S Uhlenhake
(74) *Attorney, Agent, or Firm* — WOMBLE BOND DICKINSON (US) LLP

(57) ABSTRACT

Provided is a nozzle inspection method, the nozzle inspection method including: an operation of forming a pattern for inspection, including a first chemical solution discharge operation of discharging a chemical solution onto a substrate in a first state in which a distance between a substrate and a first nozzle is a first distance and a second chemical solution discharge operation of discharging a chemical solution onto a substrate in a second state in which a distance between the substrate and the first nozzle is a second distance, different from the first distance; and an inspection operation of inspecting the pattern for inspection to determine whether a nozzle is defective.

16 Claims, 16 Drawing Sheets

NOZZLE INSPECTION METHOD, NOZZLE INSPECTION APPARATUS, AND SUBSTRATE PROCESSING DEVICE

CROSS-REFERENCE TO RELATED APPLICATION(S)

This application claims the benefit of a priority to Korean Patent Application No. 10-2023-0016788 filed on Feb. 8, 2023 in the Korean Intellectual Property Office, the entire disclosure of which is incorporated herein by reference for all purposes.

BACKGROUND

The present disclosure relates to a nozzle inspection method, a nozzle inspection apparatus, and a substrate processing device including the same.

For a display device such as an organic EL display device, a manufacturing process such as a chemical solution discharge process, or the like, is performed on a substrate with a larger area, as each generation passes.

To manufacture display devices such as LCD panels, PDP panels, LED panels, or the like, a printing process (e.g., RGB patterning) is performed on a substrate. The printing process is performed using printing equipment equipped with such an inkjet head. In performing the printing process, defects may occur if a chemical solution is not properly discharged from an inkjet head nozzle, and to this end, inspection of the nozzle is required.

(Patent Document 1) KR 10-2010-0135392 A

SUMMARY

In order to achieve the above-described object, an aspect of the present disclosure is to provide a nozzle inspection method, a nozzle inspection apparatus, which can accurately inspect an inkjet head nozzle, and a substrate processing device including the same.

An aspect of the present disclosure is to provide a nozzle inspection method, a nozzle inspection apparatus, and a substrate processing device including the same.

According to an aspect of the present disclosure, provided is a nozzle inspection method, the nozzle inspection method including: an operation of forming a pattern for inspection, including a first chemical solution discharge operation of discharging a chemical solution onto a substrate in a first state in which a distance between a substrate and a first nozzle is a first distance a second chemical solution discharge operation of discharging a chemical solution onto a substrate in a second state in which a distance between the substrate and the first nozzle is a second distance, different from the first distance; and an inspection operation of inspecting the pattern for inspection to determine whether a nozzle is defective.

According to an aspect of the present disclosure, provided is a nozzle inspection apparatus, the nozzle inspection apparatus including: a stage on which a substrate is moved; an inkjet head module disposed on the stage, and including a first nozzle for discharging a chemical solution onto the substrate to form a pattern for inspection; a vision module disposed on the stage, and imaging the pattern for inspection; and a control module connected to the stage, the inkjet head module, and the vision module, forming the pattern for inspection, and determining whether the first nozzle is defective based on the imaging result, wherein the control module controls the stage and the inkjet head module so that the pattern for inspection includes a pattern of a chemical solution discharged in a first state in which a distance between the substrate and the first nozzle is a first distance and in a second state in which a distance between the substrate and the first nozzle is a second distance, different from the first distance.

According to an aspect of the present disclosure, provided is a substrate processing device, the substrate processing device including: a first stage disposed in a first region, a printing region; a second stage disposed in a second region, an inspection region; one or more gantries disposed to move the first and second stages; an inkjet head module installed on the gantry and including a first nozzle and a second nozzle discharging a chemical solution; a vision module installed on the gantry; and a control module connected to the first and second stages, the gantry, the inkjet head module, and the vision module, wherein the control module forms a pattern for inspection by discharging a chemical solution while changing a distance between the first nozzle and a substrate for inspection in the inspection region, and the vision module images the pattern for inspection.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
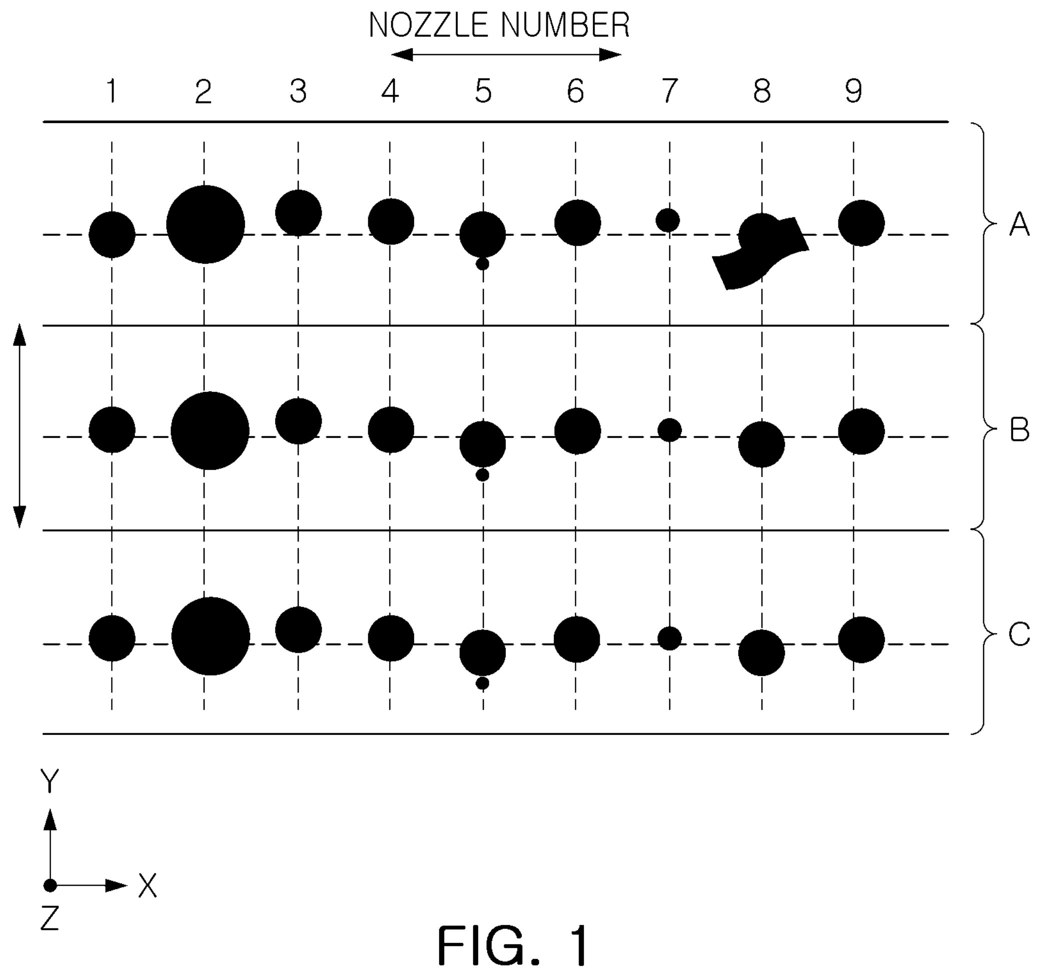
FIG. 1 is a schematic diagram of a pattern for inspection for nozzle inspection.

Hereinafter, preferred embodiments of the present disclosure will be described in detail so that those skilled in the art could easily practice the present disclosure with reference to the accompanying drawings. However, in describing a preferred embodiment of the present disclosure in detail, if it is determined that a detailed description of a related known function or configuration may unnecessarily obscure the subject matter of the present disclosure, the detailed description will be omitted. In addition, the same reference numerals are used throughout the drawings for parts having similar functions and actions. In addition, in the present specification, terms such as 'upper,' 'upper portion,' 'upper surface,' 'lower,' 'lower portion,' 'lower surface,' 'side surface,' and the like are based on the drawings, and in practice, it may be different depending on a direction in which the components are disposed.

In addition, throughout the specification, when a part is said to be 'connected' to another part, this is not only when it is 'directly connected,' but also when it is 'indirectly connected' with other components therebetween. In addition, 'including' a certain component means that other components may be further included without excluding other components unless otherwise stated.

Figure 2:
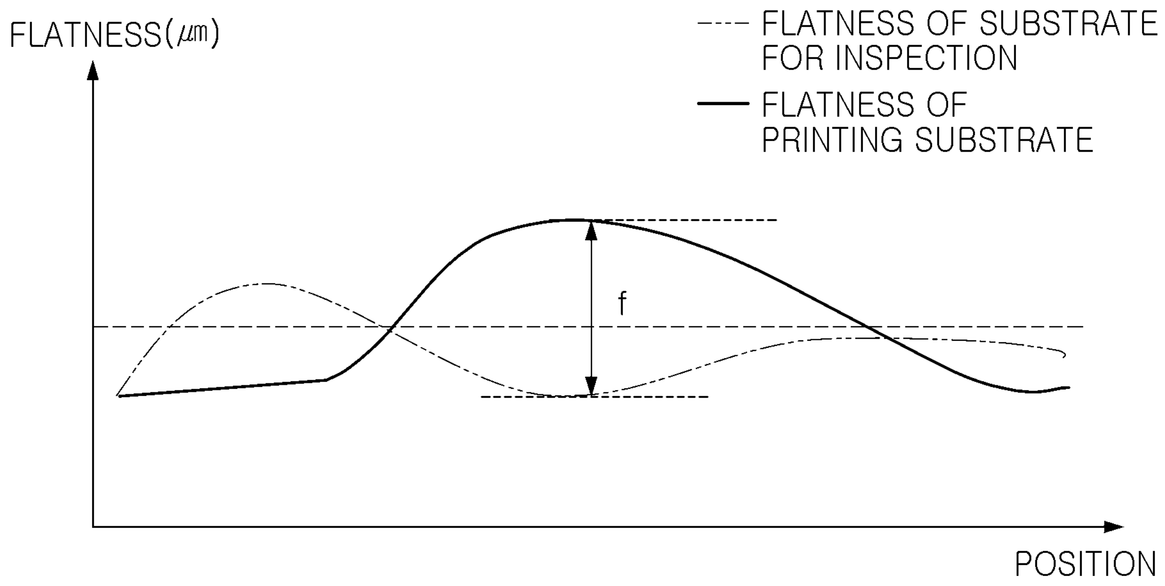
FIG. 2 is a graph of flatness according to a position of a substrate for inspection and a printing substrate.

FIG. 1 illustrates a schematic diagram of a pattern for inspection for nozzle inspection, and FIG. 2 illustrates a graph of flatness according to positions of a substrate for inspection and a printing substrate.

As illustrated in FIG. 1, in order to determine a state of a plurality of nozzles disposed on an inkjet head module in a first direction (X), one or more drops for each nozzle are continuously dropped on a substrate for inspection in a second direction (Y), to form a pattern for inspection, and the image dropped on the pattern for inspection is inspected to determine a discharge state of each nozzle. In this case, in the inspection, a region of interest (ROI) is set on each dot and whether each nozzle discharges a chemical solution or not, shape, center position, diameter, area, whether there is a satellite droplet or not, and the like, are inspected, and defective nozzles are determined through the inspection.

A drop of chemical solution dropped from a nozzle is affected by various factors, and thereamong, a shape of the drop, dropped depending on a height between the nozzle and the substrate may be changed. In other words, even if the drop drops properly at a certain height, it may not drop properly when the height changes.

In the case of nozzle inspection, a pattern for inspection is formed on a substrate for inspection. In the case of the substrate for inspection, the substrate for inspection may be formed of the same material as a printing substrate, but may also have the same size as the printing substrate, but have a different size.

As illustrated in a graph of flatness according to a position of the substrate for inspection and the printing substrate, even when a distance between the substrate and the nozzle is set as the same distance, since the flatness of the substrate for inspection and the printing substrate do not match, there may be significant distance deviation depending on the position thereof, which means that even if a normal drop image is formed by the nozzle on the substrate for inspection, defects may occur on the printing substrate due to a change in the distance between the printing substrate and the nozzle.

When using a film-type substrate as a substrate for inspection, and a glass substrate as a printing substrate, the flatness of the film-type substrate and the glass substrate are different, so even if a normal drop is formed by discharging a chemical solution at a set distance on the film-type substrate, a normal drop may not be formed at a specific position where the flatness changes on the glass substrate and defects may occur.

The present disclosure is to solve the problem that defects occur due to a change in a distance between the nozzle and the substrate during printing depending on flatness of the substrate for inspection or printing substrate, and that accurate inspection is difficult to perform due to a difference in the flatness between the substrate for inspection and the printing substrate.

Figure 3:
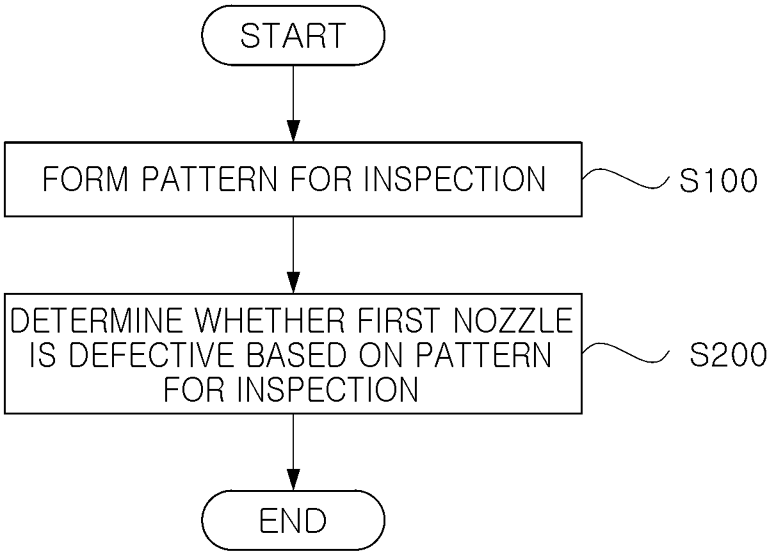
FIGS. 3 and 4 are flowcharts of a nozzle inspection method according to an embodiment of the present disclosure.
Figure 4:
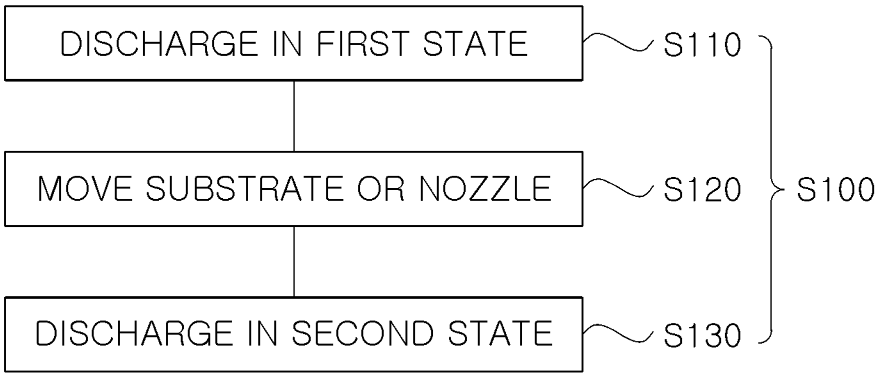
Figure 5:
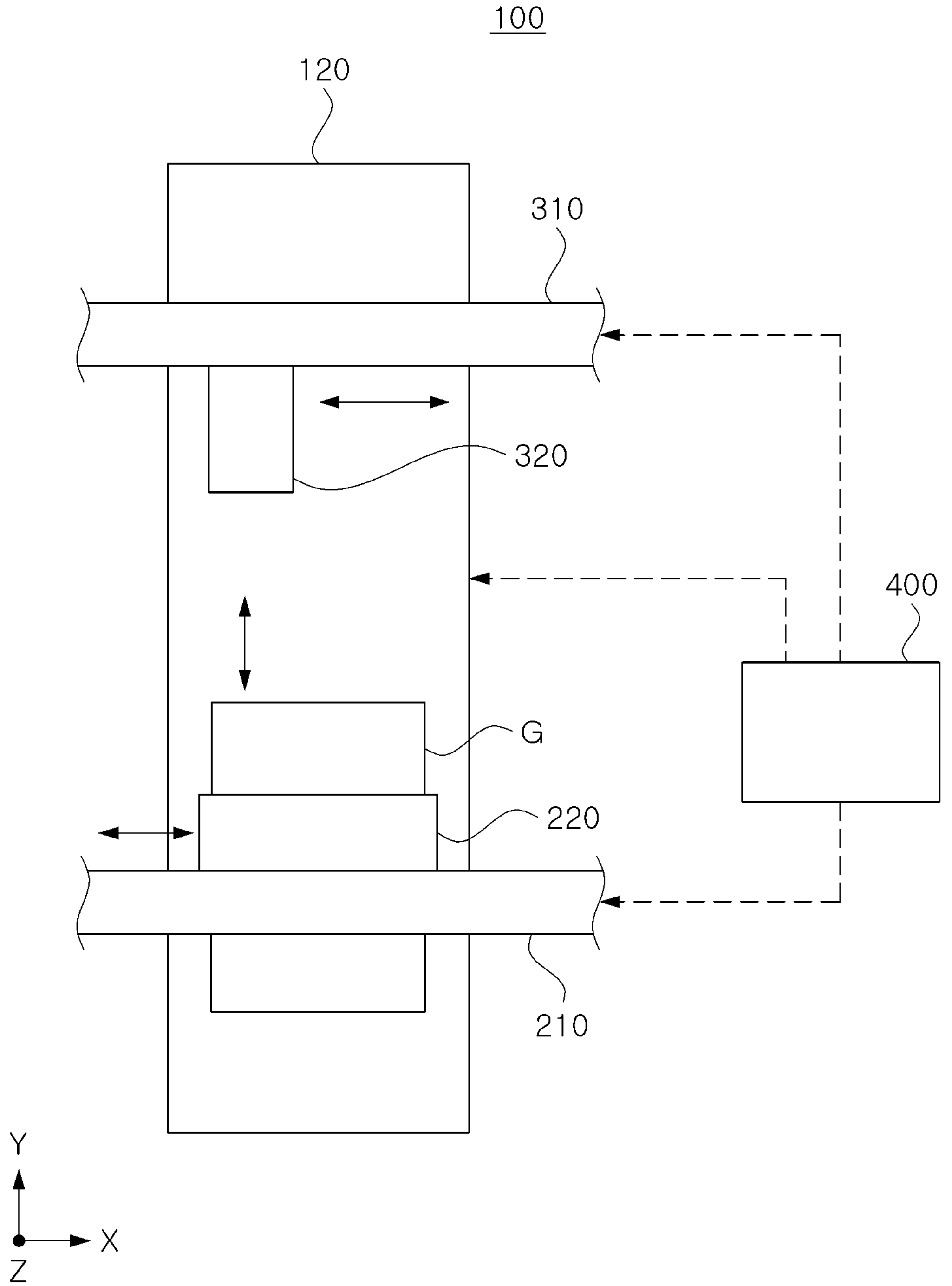
FIG. 5 is a schematic diagram of a substrate processing device according to an embodiment of the present disclosure.
Figure 6:
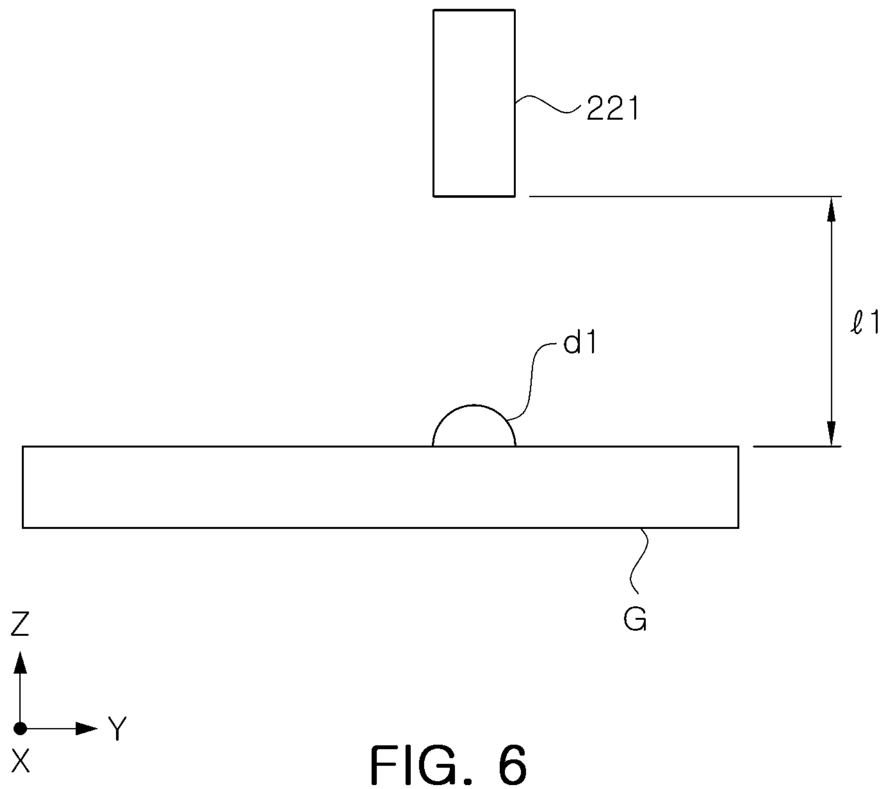
FIGS. 6 to 8 are schematic diagrams of an operation of forming a pattern for inspection.
Figure 7:
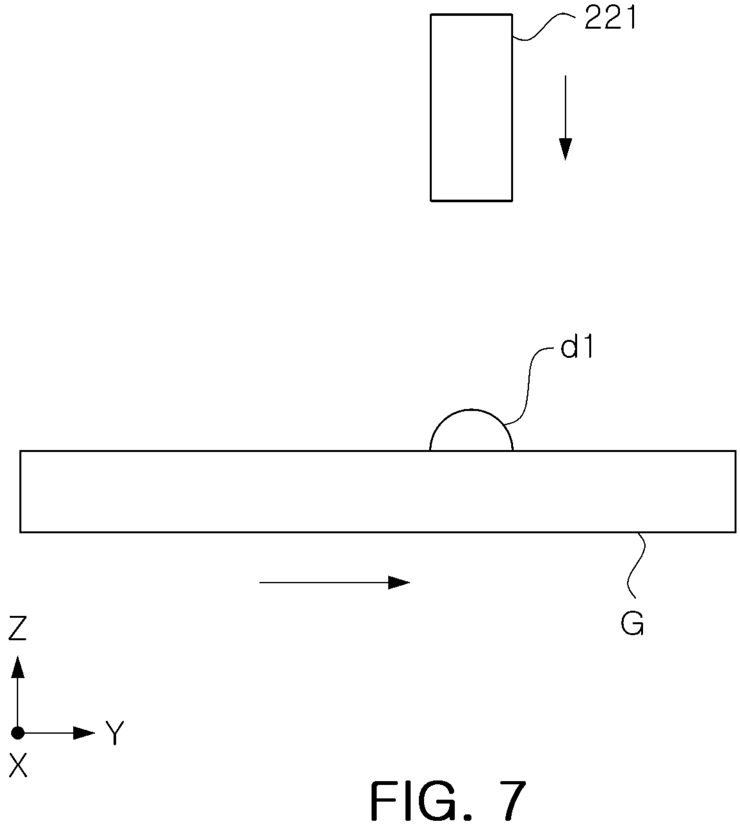
Figure 8:
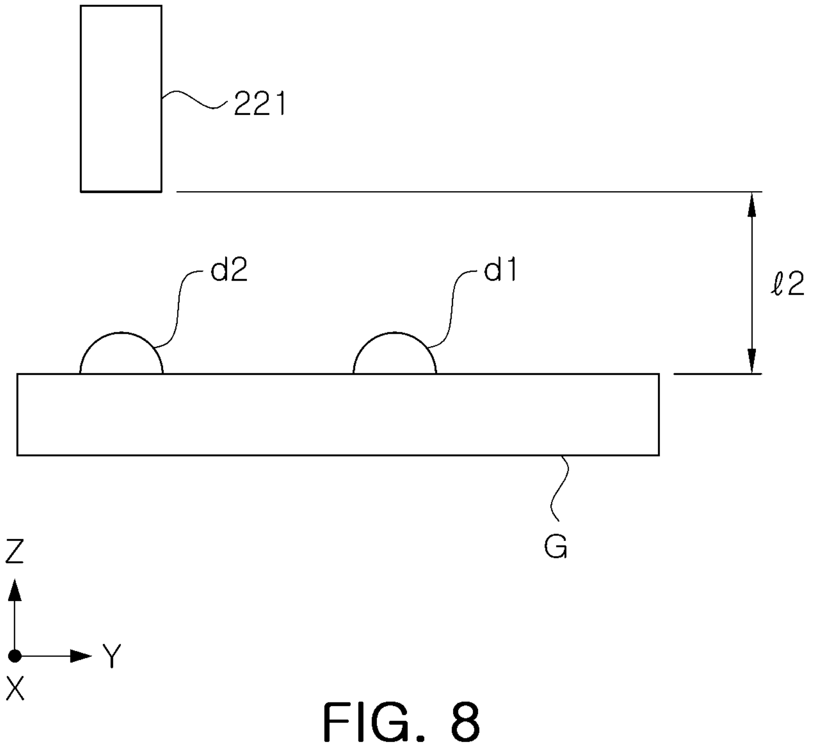

FIGS. 3 and 4 illustrate a flowchart of a nozzle inspection method according to an embodiment of the present disclosure, FIG. 5 illustrates a schematic diagram of a substrate processing device according to an embodiment of the present disclosure, and FIGS. 6 to 8 illustrate schematic diagrams of the inspection pattern forming operation of FIG. 4. The nozzle inspection method of FIGS. 3 and 4 may be performed in the substrate processing device of FIG. 5.

As illustrated in FIGS. 3 and 4, the nozzle inspection method according to an embodiment of the present disclosure includes an operation of forming a pattern for inspection (S100) of forming a pattern for inspection and an inspection operation of determining whether a first nozzle is defective based on the pattern for inspection (S200). The operation of forming a pattern for inspection (S100) includes a first chemical solution discharge operation (S110) of discharging a chemical solution onto a substrate in a first state in which a distance between a substrate and a first nozzle is a first distance, a distance adjustment operation (S120) of moving the substrate or the first nozzle in a vertical direction, and a second chemical solution discharge operation (S130) of discharging a chemical solution onto the substrate in a second state in which the distance between the substrate and the first nozzle is a second distance, different from the first distance.

The inspection operation (S200) determines whether the imaged image of the pattern for inspection satisfies preset conditions, presence of absence of chemical solution, shape, center position, diameter, area, and presence or absence of satellite droplets, and determines that a nozzle of forming the corresponding pattern is defective when any one of the patterns discharges to a region of interest satisfies the set defective determination conditions.

The substrate processing device 100 includes a stage 120, a first gantry 210, an inkjet head module 220, a second gantry 310, a vision module 320, and a control module 400.

The stage 120 is a region for supporting and moving a substrate G. A method of moving the substrate G on the stage 120 is not limited to a specific method. For example, a holder may hold and move the substrate G, or the substrate G may be moved by a plate, moved in a roll-to-roll manner.

For example, the stage 120 may extend in a second direction Y, may move the substrate G in the second direction Y, and may be moved in all of the first to third directions X, Y, and Z.

Here, the substrate G may be a substrate for inspection, and the substrate for inspection may be a film for inspection or a transparent substrate (e.g., a glass substrate) used in a display device.

The first gantry 210 is disposed on the stage 120 to across the stage 120. The first gantry 210 extends in the first direction X. The inkjet head module 220 is installed on the first gantry 210, and may move along the first gantry 210. As illustrated, the inkjet head module 220 may move in the first direction X, but the present disclosure is not limited thereto. The first gantry 210 may move on the stage 120 in a second direction Y, and as the first gantry 210 moves, the inkjet head module 220 may also be moved in the second direction Y.

The inkjet head module 220 may include multiple heads discharging ink, and each of the heads may include multiple nozzles. The ink may be, for example, quantum dot (QD) ink, but the present disclosure is not limited thereto. In the inkjet head module 220, the nozzles 221 may be moved in the third direction Z individually or may be moved in the third direction Z in a state in which the entire inkjet head module 220 is installed on the first gantry 210. In the drawings, a width of the inkjet head module 220 and a width of the substrate G are illustrated to be substantially similar, but the present disclosure is not limited thereto.

A plurality of regions of interest (ROI) may be disposed on the substrate G in the first direction X and the second direction Y. Here, the region of interest (ROI) refers to a virtual region for distinguishing a region in which ink is discharged. The region of interest (ROI) may be determined by calculation of a control module 400.

The control module 400 forms a pattern for inspection by discharging a plurality of droplets from the nozzle of the inkjet head module 220 to a region of interest (ROI) corresponding to the first nozzle.

The second gantry 310 is disposed on the stage 120, to cross the stage 120. The second gantry 310 extends in the first direction X, similarly to the first gantry 210.

The vision module 320 may be installed on the second gantry 310, and may move along the second gantry 310. As illustrated, the vision module 320 may be moved in the first direction X, and as the second gantry 310 moves in the second direction Y, the vision module 320 may be moved in the second direction Y, together with the second gantry Y. The vision module 320 acquires an image by imaging the formed pattern for inspection, and transmits the image to the control module 400 to determine whether the image is defective in the control module 400.

The control module 400 is connected to the stage 120, the first gantry 210, the inkjet head module 220, the second gantry 310, and the vision module 320, and controls each thereof to perform nozzle inspection. In addition, the control module 400 determines whether the nozzle of the inkjet head module 220 is defective based on the imaged image of the pattern for inspection.

The operation of forming a pattern for inspection (S100) of the present disclosure will be described in detail with reference to FIGS. 6 to 8.

As illustrated in FIG. 6, in the first chemical discharge operation (S110), in a first state in which a distance from a first nozzle 221 provided in the inkjet head module 220 to the substrate G is a first distance l1, the first nozzle 221 discharges a first droplet d1 to the region of interest of the substrate G.

Subsequently, as illustrated in FIG. 7, the substrate G is moved in the second direction Y, and a distance adjustment operation (S120) in which the first nozzle 221 rises is performed. The distance adjustment operation (S120) is an operation in which the distance between the first nozzle 221 and the substrate G is changed, and as illustrated in FIG. 7, the first nozzle 221 may be raised, but the present disclosure is not limited thereto, the first nozzle 221 may also be lowered, or the substrate G may also be raised or lowered, and the substrate G and the first nozzle 221 may also be moved together.

In addition, the substrate G or the first nozzle 221 may be horizontally moved so that a second droplet d2 (see FIG. 8) is discharged to a region of interest, different from the first droplet d1. If the chemical solution discharged from the first nozzle 221 may be dropped on another position of the substrate G, the substrate G may be moved through the stage 120, or the first gantry 210, or the inkjet head module 220, or the first nozzle 221 may be moved.

In the distance adjustment operation (S120), if the distance between the substrate G and the first nozzle 221 is adjusted, either the substrate G or the first nozzle 221 may be moved.

Thereafter, as illustrated in FIG. 8, in the second chemical solution discharge operation (S130), in a second state in which a distance from the first nozzle 221 to the substrate G is a second distance l2, different from the first distance l1, the first nozzle 221 discharges a droplet d2 to a region of interest of the substrate G.

One of the first distance l1 and the second distance l2 may be a set distance between the first nozzle 221 and the substrate G, and the other thereof may be a distance obtained by adding or subtracting maximum deviation from the set distance. For example, the first distance l1 may be a set distance, and the second distance l2 may be a distance obtained by adding the maximum deviation of flatness to the set distance.

As described above, by forming a pattern for inspection while changing a distance between the first nozzle 221 and the substrate G, when printing with an actual printing substrate, even when the distance between the first nozzle 221 and the substrate G changes due to flatness of the printing substrate, it may be inspected using a substrate for inspection. According to the substrate processing device 100 and the nozzle inspection method according to an embodiment of the present disclosure, defects that could not be inspected when performed without adjusting the distance from the substrate for inspection to the nozzle can be predicted, making it possible to perform precise inspection.

Figure 9:
FIG. 9 is a flowchart of an operation of forming a pattern for inspection according to another embodiment of the present disclosure.

FIG. 9 illustrates a flowchart of an operation of forming a pattern for inspection according to another embodiment of the present disclosure, and FIGS. 10 to 14 illustrate schematic diagrams of the operation of forming a pattern for inspection of FIG. 9.

Basically, a configuration of the substrate processing device 100 in the embodiments of FIGS. 9 to 14 is the same as that of the substrate processing device 100 illustrated in FIG. 5, but there is a difference in the inspection method, so the description will focus thereon.

The operation of forming a pattern form inspection (S100) in the embodiment of FIG. 9 may include: a first chemical solution discharge operation (S110) of discharging a chemical solution onto a substrate in a first state in which a distance between a substrate and a first nozzle is a first distance, a distance adjustment operation (S120) of moving the substrate or the first nozzle in a vertical direction, a second chemical solution discharge operation (S130) of discharging a chemical solution onto the substrate in a second state in which a distance between the substrate and the first nozzle is a second distance, different from the first distance, and a distance adjustment operation (S140) of moving the substrate or the first nozzle in a vertical direction again, and the operation of forming a pattern for inspection includes a third chemical solution discharge operation (S150) of discharging a chemical solution onto the substrate in a third state in which a distance between the substrate and the first nozzle is a third distance, different from the first distance and the second distance.

The operation of forming a pattern for inspection (S100) of the present disclosure will be described in detail with reference to FIGS. 10 to 14.

Figure 10:
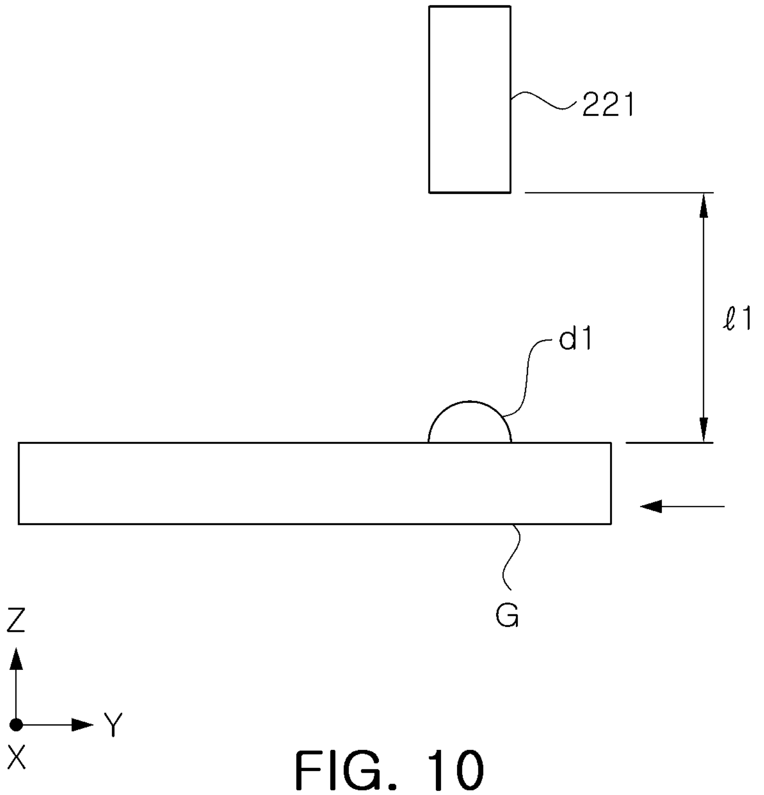
FIGS. 10 to 14 are schematic diagrams of the operation for forming a pattern for inspection of FIG. 9.

As illustrated in FIG. 10, in the first chemical solution discharge operation (S110), in a first state in which a distance from a first nozzle 221 provided in an inkjet head module 220 to a substrate G is a first distance l1, the first nozzle 221 discharges a first droplet d1 to a region of interest of the substrate G. In this case, the first distance l1 may be a set distance between the first nozzle 221 and the substrate G for printing.

Figure 11:
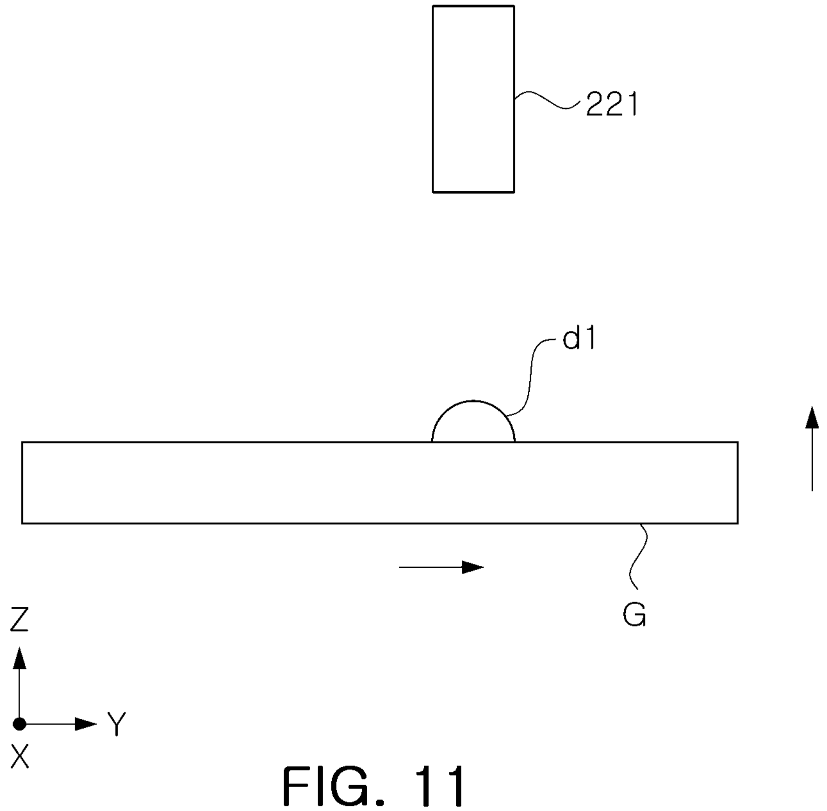

Subsequently, as illustrated in FIG. 11, in the distance adjustment operation (S120), a substrate G is moved in a second direction Y and a third direction Z, and the first nozzle 221 is fixed. The distance adjustment operation (S120) is an operation in which the distance between the first nozzle 221 and the substrate G is changed, and as illustrated in FIG. 11, the operation may be performed in a state in which the first nozzle 221 is fixed, but may also be performed in a state in which the substrate G is fixed, and may also be performed separately into horizontal movement and vertical movement. In this case, the substrate G rises so that the distance between the substrate G and the first nozzle 221 becomes smaller than the first distance l1.

Figure 12:
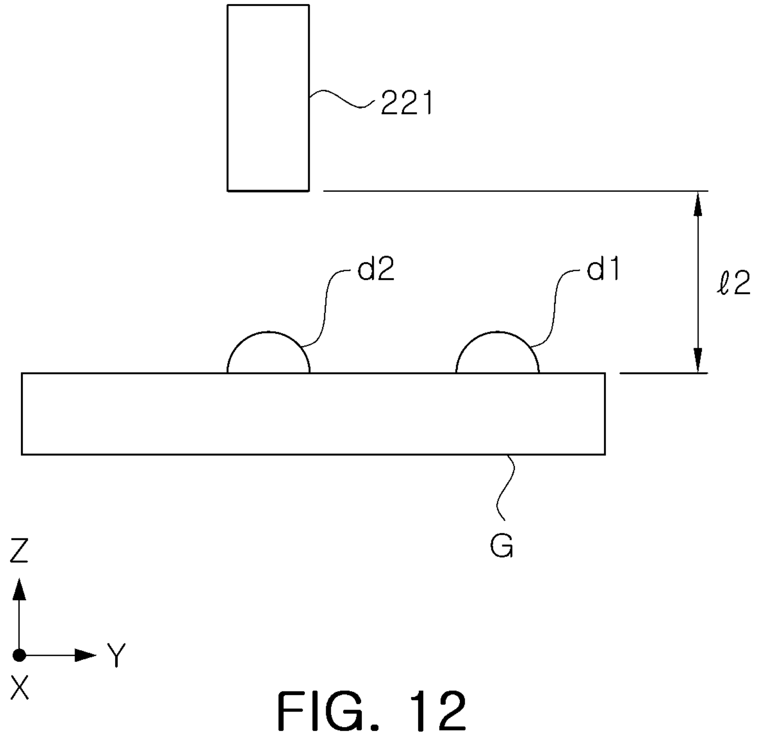

Thereafter, as illustrated in FIG. 12, in the second chemical solution discharge operation (S130), in a second state in which a distance from the first nozzle 221 to a substrate G is a second distance l2, different from the first distance l1, the first nozzle 221 discharges a second droplet d2 to a region of interest of the substrate G. In this case, the second distance l2 may be smaller than the first distance l1. For example, when the substrate for inspection and the printing substrate have the same shape, the second distance l2 may be a distance obtained by subtracting a maximum value of the flatness of the substrate G from the first distance l1, and when the substrate for inspection and the printing substrate are have different shapes, the second distance l2 may be a distance obtained by subtracting a difference in maximum flatness (f in FIG. 2) between the substrate for inspection and the printing substrate. When the substrate for inspection and the printing substrate are different, accurate inspection can be performed by reflecting a difference in inspection and printing conditions by subtracting the difference in maximum flatness between the substrate for inspection and the printing substrate.

Figure 13:
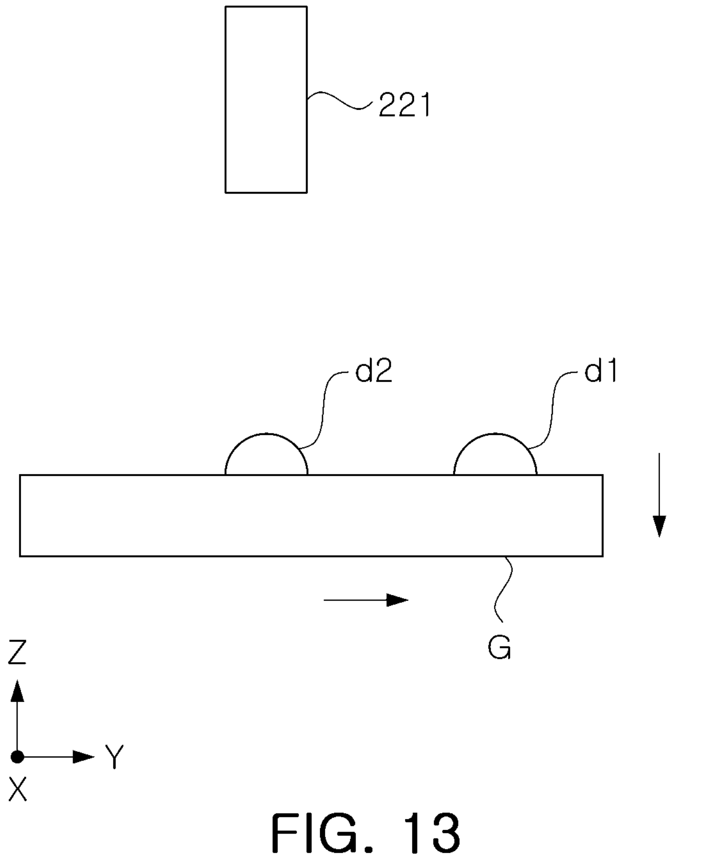

As illustrated in FIG. 13, after discharging a second droplet d2, the distance adjustment operation (S140) is performed again. While the first nozzle 221 is fixed, the substrate G is moved in the second direction Y and the third direction Z. In the distance adjustment operation (S140), the substrate G is lowered so that the distance between the substrate G and the first nozzle 221 is greater than the second distance l2, and the substrate G is moved in a horizontal direction so that a third droplet d3 is dropped in a region of interest, different from that of the second chemical solution discharge operation (S130). In this case, the substrate G is moved in the second direction Y in the same direction as in the distance adjustment operation (S140), so that the first droplet d1, the second droplet d2, and the third droplet d3 are not discharged to the same region of interest.

Figure 14:
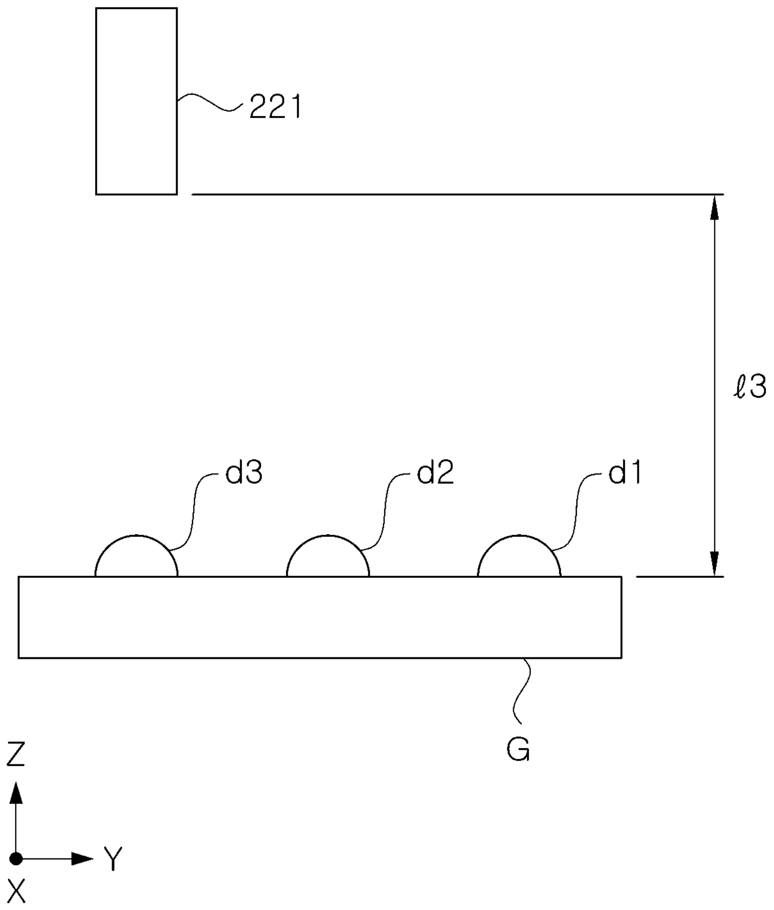

As illustrated in FIG. 14, after the distance adjustment operation (S140) is performed, a third chemical solution discharge operation (S150) is performed, and in the third chemical solution discharge operation (S150), in a third state in which the first nozzle 221 and the substrate G are separated by a third distance l3, greater than the first distance l1 or the second distance l2, the first nozzle 221 discharges a third droplet d3 to a region of interest of the substrate G.

The third distance l3 may be a distance away from the first distance l1 by a difference between the first distance l1 and the second distance l2 (l3=l1+(l1−l2)). That is, the second distance l2 and the third distance l3 may be the same distance away in the first distance l1. However, the present disclosure is not limited thereto, and various distances may be applied as long as they are set in consideration of the flatness of the substrate G.

It has been described that the first to third chemical solution discharge operations S110, S130, and S150 may be performed by discharging a chemical solution in a state in which both the first nozzle 221 and the substrate G are stopped, but the present disclosure is not limited thereto, and the first to third chemical solution discharge operations S110, S130, and S150 may be performed by discharging a chemical solution while at least one of the first nozzle 221 and the substrate G is moved. That is, it is possible to form a pattern for inspection by discharging the chemical solution while at least one of the first nozzle 221 and the substrate G is moved.

Figure 15:
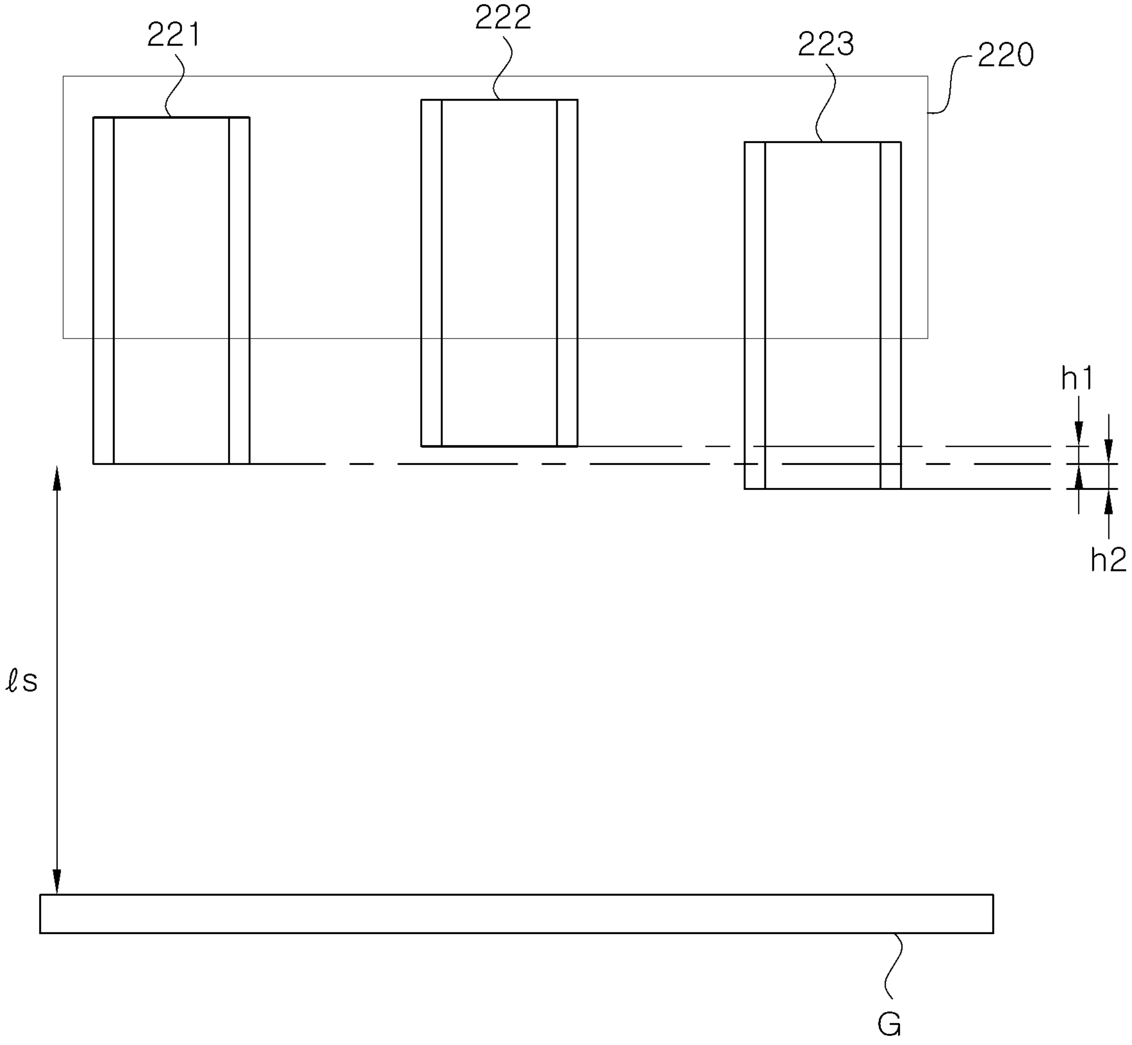
FIG. 15 is a schematic diagram of an inkjet head module according to another embodiment of the present disclosure.

FIG. 15 illustrates a schematic diagram of an inkjet head module according to another embodiment of the present disclosure. A plurality of nozzles 221, 222, and 223 may be connected to an inkjet head module 220, the inkjet head module 220 connects the plurality of nozzles 221, 222, and 223 so that the nozzles 221, 222, and 223 have the same height ls from the substrate G, but in the connected state, it is difficult to prevent height deviation h1 and h2 from occurring between the nozzles 221, 222, and 223.

That is, similarly to the flatness of the substrate (G), in the case of the nozzles 221, 222, and 223, the flatness, that is, the height deviation between the nozzles occurs, and when a chemical solution is discharged at a set distance without considering the height deviation between the nozzles, even if it is determined to be a normal nozzle during inspection due to height deviation, defects may occur during actual printing.

In an embodiment of the present disclosure, by changing the distance between the substrate G and the nozzles 221, 222, and 223, in consideration of not only the flatness of the substrate G but also the height deviation of the plurality of nozzles 221, 222, and 223, a pattern for inspection may be formed, and thereby, inspection may be performed at maximum and minimum distances that can occur during printing to determine defects in advance.

Figure 16A:
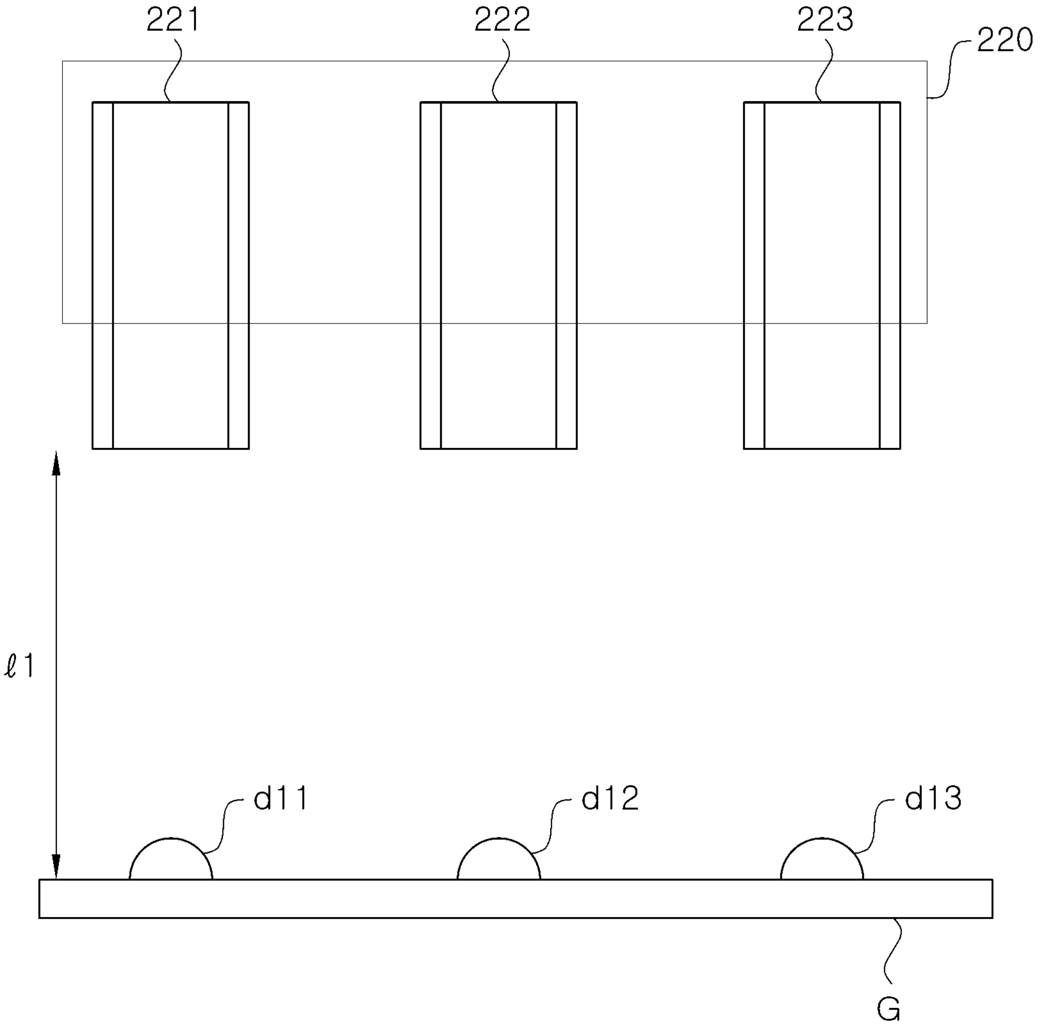
FIGS. 16A to 18B are schematic diagrams of the operation of forming a pattern for inspection using an inkjet head module of FIG. 15 and schematic diagrams of a pattern for inspection formed thereby.
Figure 16B:
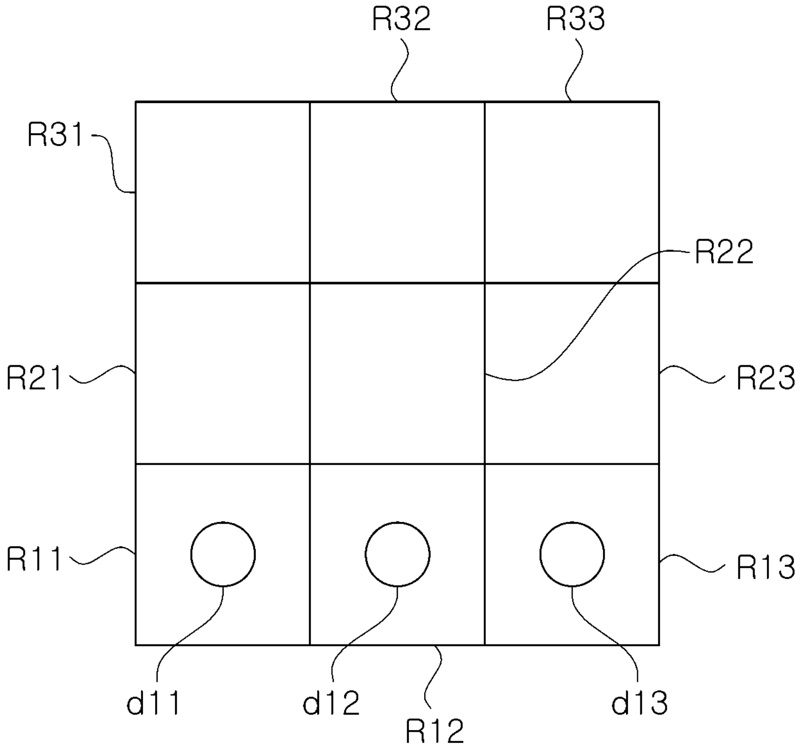
Figure 17A:
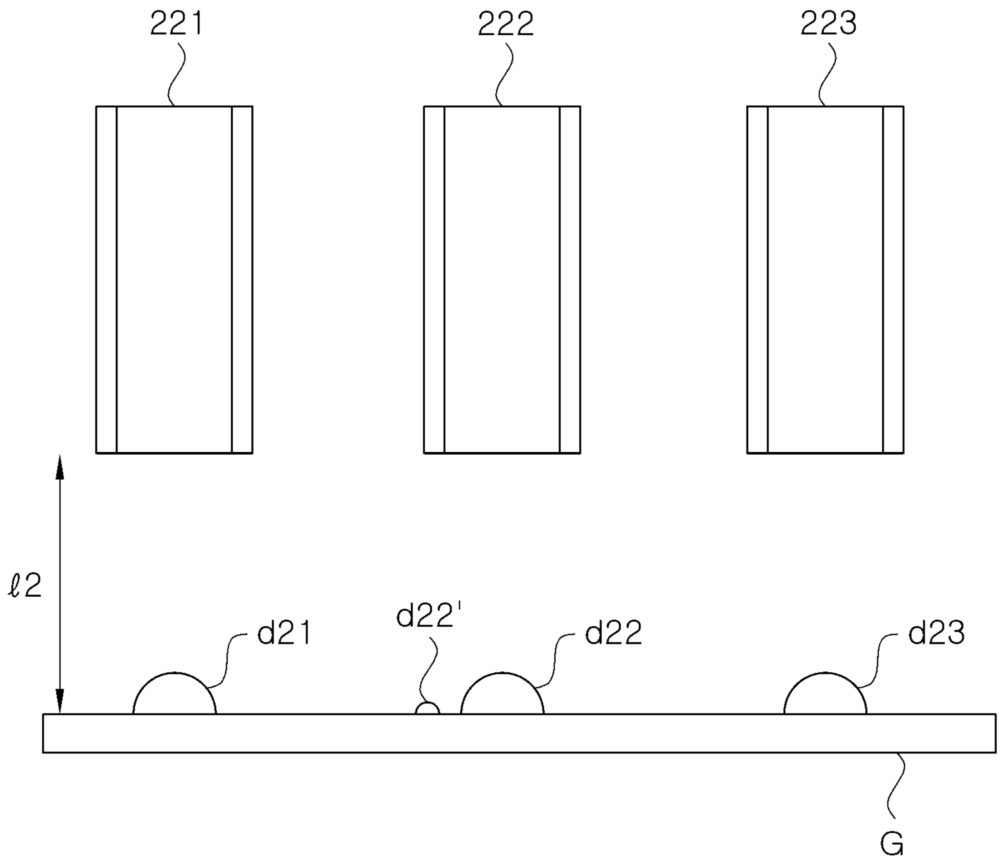
Figure 17B:
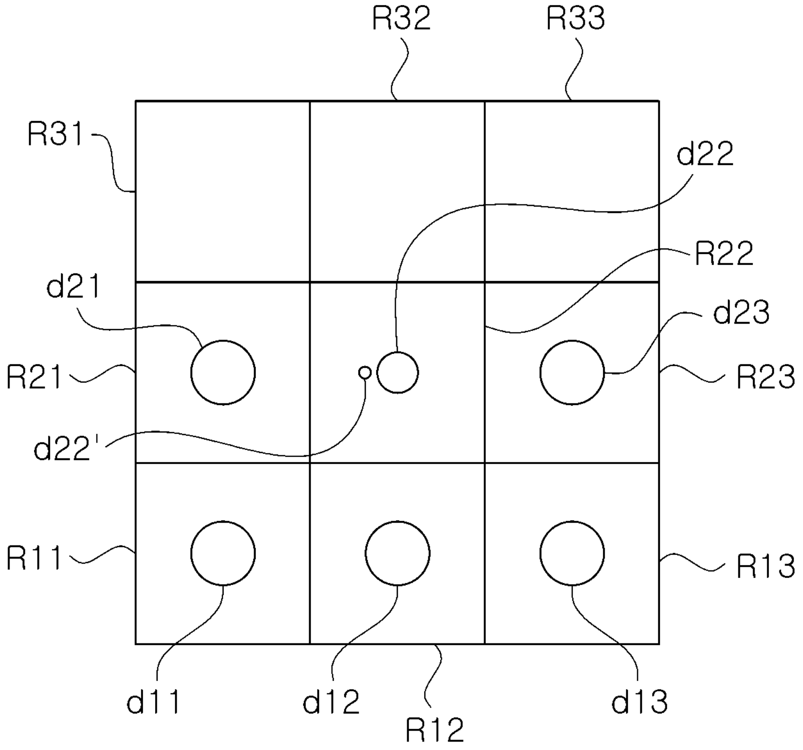
Figure 18A:
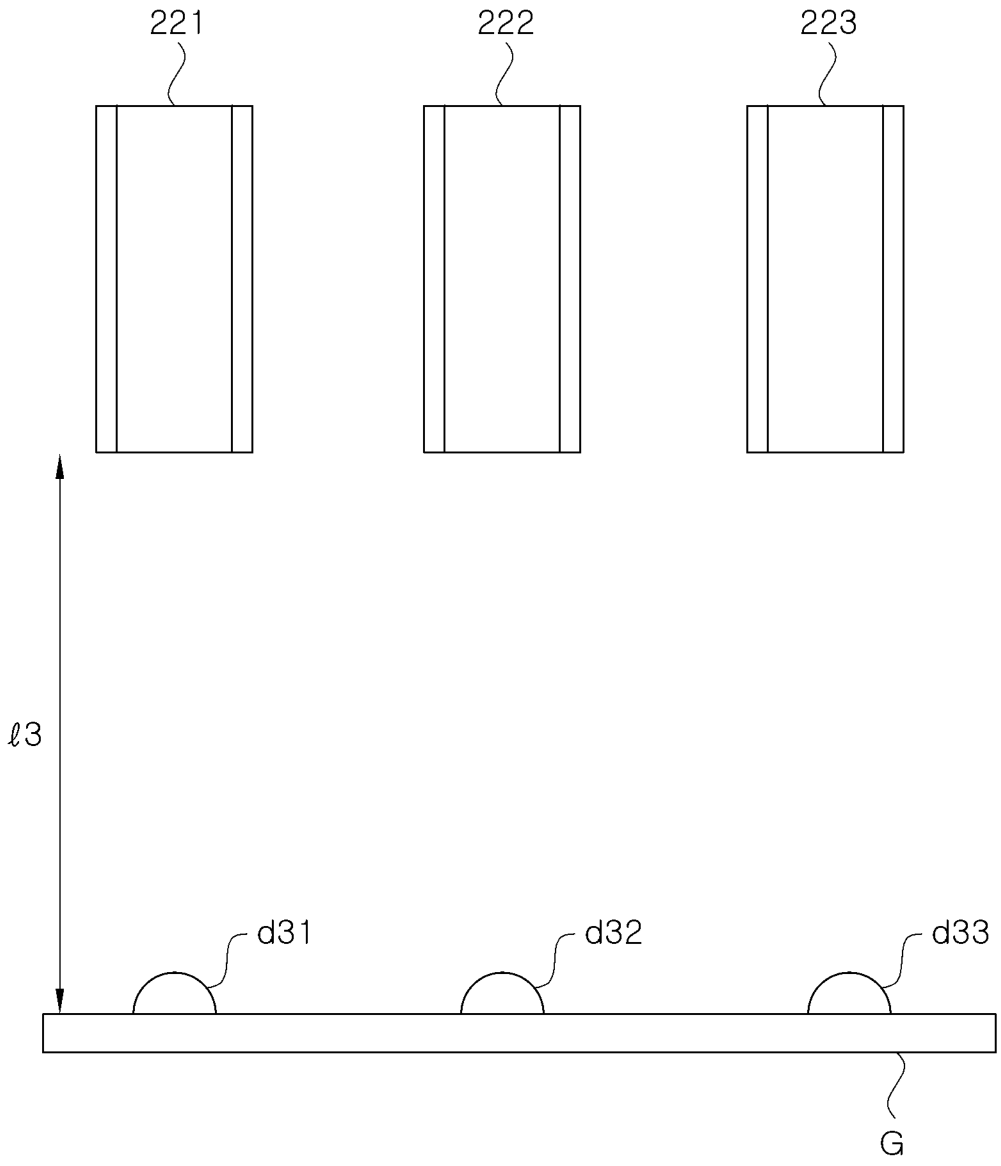
Figure 18B:
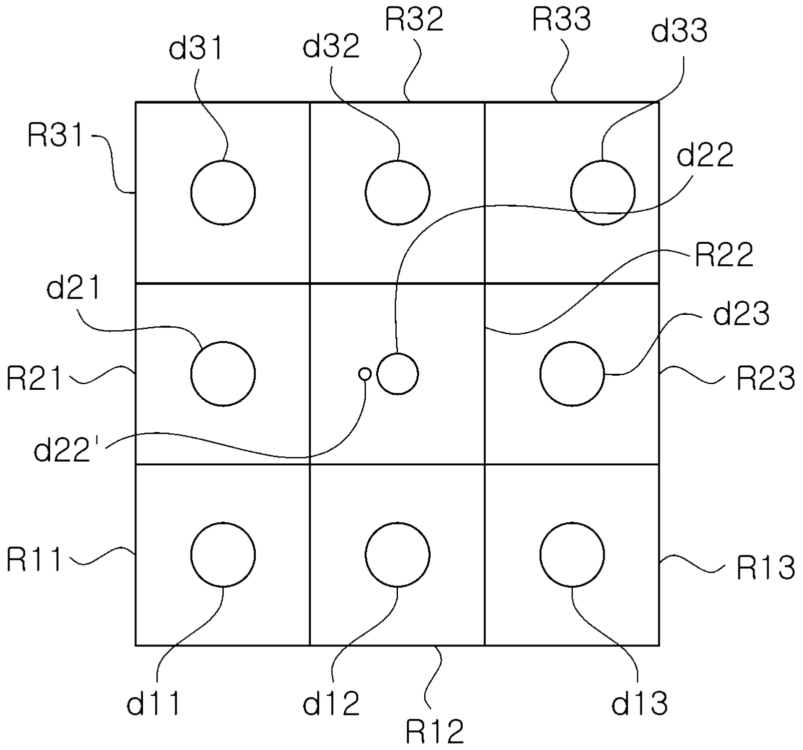

FIGS. 16A, 17A, and 18A illustrate schematic diagrams in which operation of forming a pattern for inspection is performed using an inkjet head module of FIG. 15, and FIGS. 16B, 17B, and 18B illustrate schematic diagrams of the pattern for inspection formed in FIGS. 16A, 17A, and 18A.

In this embodiment, the nozzle inspection method is performed in the same manner as the embodiment of FIG. 9, that is, by discharging a chemical solution from at least three positions at different distances, and FIG. 16 illustrates an operation of discharging a first chemical solution (S110), FIG. 17 illustrates an operation of discharging a second chemical solution (S130), and FIG. 18 illustrates an operation of discharging a third chemical solution (S150).

As illustrated in FIGS. 16A and 16B, in the operation of discharging a first chemical solution (S110), a first nozzle 221, a second nozzle 222, and a third nozzle 223 are connected to an inkjet head module 220. The first to third nozzles 221, 222, and 223 may be configured to move together in a third direction Z in the inkjet head module 220, but the present disclosure is not limited thereto, and may be moved individually.

In a first state in which a distance from the first to third nozzles 221, 222, and 223 to a substrate G is a first distance l1, the first nozzle 221 discharges a first droplet d1 to a region of interest of the substrate G. In this case, the first distance l1 may be a set distance ls between the first nozzle 221 and the substrate G for printing.

The first to third nozzles 221, 222, and 223 discharge a chemical solution to regions of interest R11, R12, and R13, respectively. The first nozzle 221 discharges a 1-1 droplet d11 to the 1-1 region of interest R11, the second nozzle 222 discharges a 1-2 droplet d12 to the 1-2 region of interest R12, and the third nozzle 223 discharges a 1-3 droplet d13 to the 1-3 region of interest R13.

Subsequently, although not illustrated, the substrate G and/or the nozzles 221, 222, and 223 are moved in a second direction Y and a third direction Z through a distance adjustment operation, so that the operation of discharging a second chemical solution (S130) is performed while positions of the substrate G and the nozzles 221, 222, and 223 in horizontal and vertical directions are changed.

As illustrated in FIG. 17A, in the operation of discharging a second chemical solution (S130), in a second state in which a distance from the first to third nozzles 221, 222, and 223 to the substrate G is a second distance l2, different from the first distance l1, the first to third nozzles 221, 222, and 223 discharge 2-1, 2-2, and 2-3 droplets d21, d22, and d23 to 2-1, 2-2, and 2-3 regions of interest R21, R22, and R23. In this case, the second distance l2 may be smaller than the first distance l1, and may be a distance obtained by subtracting maximum deviation (h1+h2 in FIG. 15) of a difference in maximum flatness between a substrate for inspection and a printing substrate (f in FIG. 2)(l2=l1−(f+(h1+h2))). When the substrate for inspection and the printing substrate are different, by subtracting height deviation of the nozzles 221, 222, and 223 in addition to the difference in maximum flatness between the substrate for inspection and the printing substrate, accurate inspection may be performed by reflecting a difference in inspection and printing conditions and a difference between the nozzles 221, 222, and 223.

The first to third nozzles 221, 222, and 223 discharge a chemical solution to regions of interest R21, R22, and R23, respectively. The first nozzle 221 discharges a 2-1 droplet d21 to a 2-1 region of interest R21, the second nozzle 222 discharges a 2-2 droplet d22 to a 2-2 region of interest R22, and the third nozzle 223 discharges a 2-3 droplet d23 to a 2-3 region of interest R23. In this embodiment, the 2-2 droplet d22 discharged from the second nozzle 222 includes a satellite droplet d22'.

Subsequently, although not illustrated, the substrate G and/or the nozzles 221, 222, and 223 are moved again in a second direction Y and a third direction Z through a distance adjustment operation, so that a third chemical solution discharge operation (S150) is performed in a state in which positions of the substrate G and the nozzles 221, 222, and 223 in horizontal and vertical directions are changed, from the first and second chemical solution discharge operations (S110 and S130).

In the third chemical discharge operation (S150), in a third state in which the first nozzle 221 and the substrate G are separated by a third distance l3, greater than the first distance l1 or the second distance l2, the first nozzle 221 discharges a third droplet d3 to a region of interest of the substrate G.

The third distance l3 may be a distance away from the first distance l1 by a difference between the first distance l1 and the second distance l2 (l3=l1+(l1−l2)). That is, the second distance l2 and the third distance l3 may be the same distance away from the first distance l1. That is, the third distance l3 may be a distance obtained by adding a difference in maximum flatness between a substrate for inspection and a printing substrate (f in FIG. 2) and maximum deviation (h1+h2 in FIG. 15) of the nozzles 221, 222, and 223, to the first distance l1.

The first to third nozzles 221, 222, and 223 discharge chemical solution to regions of interest R31, R32, and R33 to the first to third nozzles 221, 222, and 223. The first nozzle 221 discharges a 3-1 droplet d31 to the 3-1 region of interest R31, the second nozzle 222 discharges a 3-2 droplet d32 to the 3-2 region of interest R32, and the third nozzle 223 discharges a 3-3 droplet d33 into the 3-3 region of interest R33. In this embodiment, the 3-3 droplet d33 discharged from the third nozzle 223 dropped so that a center position thereof is misaligned.

In this embodiment, it has been described that a pattern for inspection is formed at three distances l1, l2, and l3 through three nozzles 221, 222, and 223, but this is an example, and a pattern for inspection may be formed at more various distances l1, l2, and l3 through more or fewer nozzles 221, 222, and 223.

After forming the pattern for inspection on a substrate G, the substrate G is moved to a vision module 320, the vision module 320 images a pattern for inspection and transmits the image to a control module 400, and in the control module 400, a region of interest is set on each dot of the pattern for inspection, so whether chemical solutions are discharged or not, shape, center position, diameter, area, whether satellite droplets are present or not, of the individual nozzles 221, 222, and 223, or the like, are inspected, and a defective nozzle is determined by the inspection. In this embodiment, when a distance between the nozzles 221, 222, 223 and the substrate G becomes closer, satellite droplets are generated in the second nozzle 222, and when a distance between the nozzles 221, 222, 223 and the substrate G increases, it is determined that the center position of the third nozzle 223 is misaligned, and the second nozzle 222 and the third nozzle 223 are defective.

Figure 19:
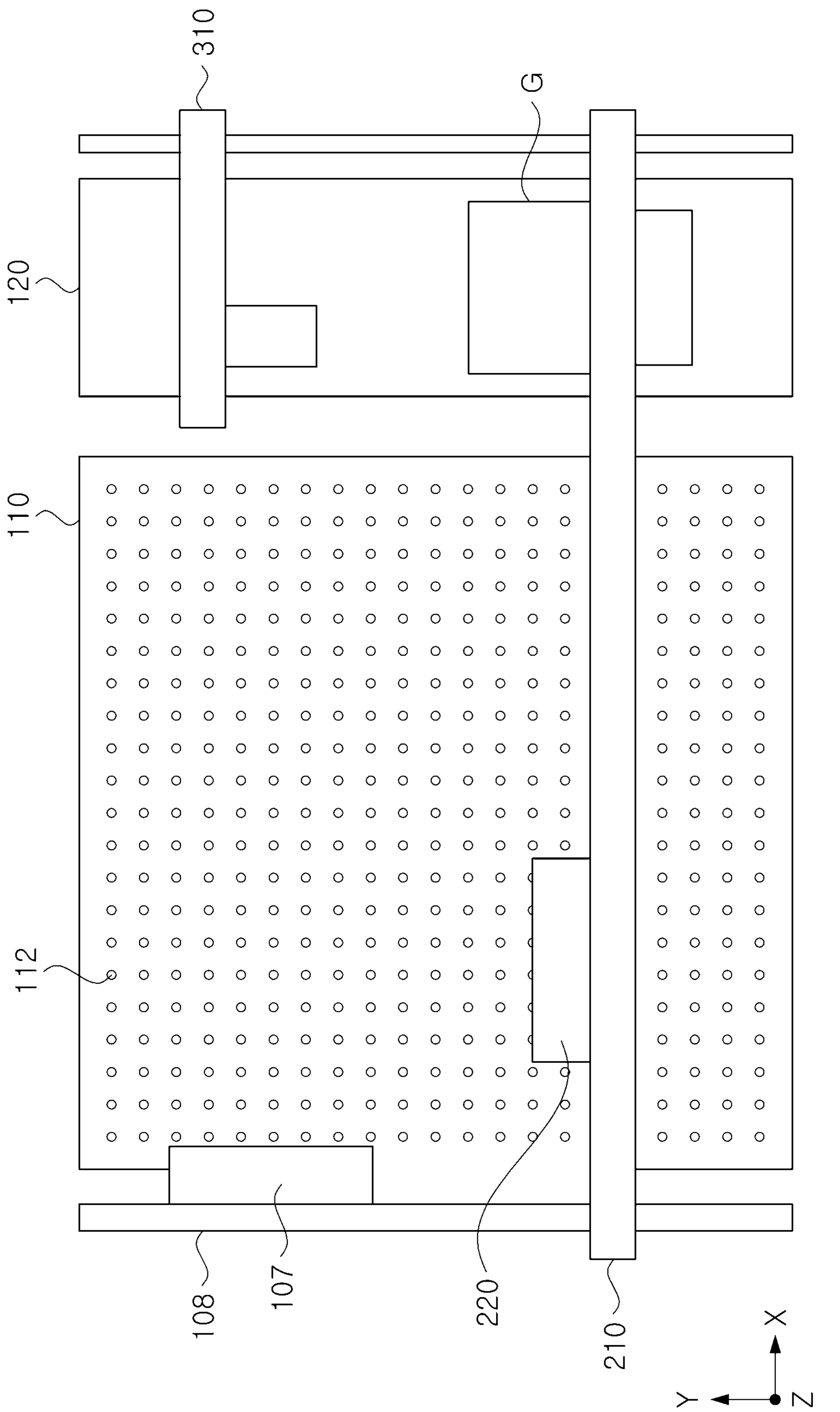
FIG. 19 is a schematic diagram of a substrate processing device of another embodiment of the present disclosure.

FIG. 19 illustrates another example of a substrate processing device according to some embodiments of the present disclosure. The same content as in FIG. 5 will be omitted.

The substrate processing device includes a first stage 110, a second stage 120, a first gantry 210, a second gantry 310, an inkjet head module 220, an vision module 320, and a holder 107.

The first stage 110 is disposed in a first region, and the second stage 120 is disposed in a second region, adjacent to the first region.

A rail 108 may be disposed in a longitudinal direction of the first stage 110, and the holder 107 may be moved along the rail 108. A plurality of holes 112 may be formed in the first stage 110, and gas can escape through the holes 112 to lift a printing substrate. The printing substrate is lifted by the gas and the holder 107 holds and moves the printing substrate.

The first gantry 210 is disposed to cross the first stage 110 and the second stage 120, and an inkjet head module 220 is installed on the first gantry 210. The inkjet head module 220 may move along the first gantry 210 to discharge droplets from the first stage 110 or the second stage 120.

A substrate for inspection G is placed on the second stage 120, and the inkjet head module 220 changes a distance between the nozzles 221, 222, 223 and the substrate G on the substrate for inspection G to form a pattern for inspection. In this case, droplets may be discharged to different regions of interest, but the present disclosure is not limited to this, and droplets may also discharge a plurality of times to one region.

After forming a pattern for inspection on the substrate for inspection G in the second stage 120, the substrate for inspection G is moved to a vision module 320, and the vision module 320 images the formed pattern for inspection and determine whether a nozzle of the inkjet head module 220 is defective. As described above, the control module 400 forms a pattern for inspection in consideration of flatness of the substrate G and height deviation of the nozzles 221, 222, and 223, so that it is possible to accurately determine whether the nozzle is defective even if printing conditions for printing on the printing substrate in the first stage 110 are different.

As set forth above, in the present disclosure, a nozzle inspection method, an inspection method, that can accurately inspect an inkjet head nozzle through the configuration described above, and a substrate processing device including the same may be provided.

In an embodiment of the present disclosure, even nozzle defects due to flatness of the substrate may be predicted, so that it is possible to perform accurate inspection.

In the above, the embodiment of the present invention has been mainly described, but the present disclosure is not limited thereto and may be variously modified and implemented.

While exemplary embodiments have been shown and described above, it will be apparent to those skilled in the art that modifications and variations could be made without departing from the scope of the present invention as defined by the appended claims.

What is claimed is:

1. A nozzle inspection method, comprising:

an operation of forming a pattern for inspection, including a first chemical solution discharge operation of discharging a first chemical solution onto a substrate in a first state in which a distance between the substrate and a first nozzle is a first distance, a second chemical solution discharge operation of discharging the chemical solution onto the substrate in a second state in which a distance between the substrate and the first nozzle is a second distance that is different from the first distance, and a third chemical solution discharge operation of discharging the chemical solution onto the substrate in a third state in which a distance between the substrate and the first nozzle is a third distance, different from the first distance and the second distance; and an inspection operation of inspecting the pattern for inspection to determine whether a nozzle is defective, wherein one of the first to third distances corresponds to a set distance between the substrate and the first nozzle, the other one of the first to third distances corresponds to a maximum distance between the substrate and the first nozzle in consideration of flatness of a printing substrate, and the remaining one of the first to third distances corresponds to a minimum distance between the substrate and the nozzle in consideration of the flatness of the printing substrate.

2. The nozzle inspection method of claim 1, wherein a distance adjustment operation of moving the substrate or the first nozzle in a vertical direction is performed between the first chemical solution discharge operation and the second chemical solution discharge operation.

3. The nozzle inspection method of claim 2, wherein the substrate is a substrate for inspection, a second nozzle is connected to an inkjet head to which the first nozzle is connected, and in the operation of forming the pattern for inspection, the second nozzle also discharges the chemical solution together with the first nozzle.

4. The nozzle inspection method of claim 1, wherein the first chemical solution discharge operation or the second chemical solution discharge operation is performed while the substrate or the first nozzle is moved in a vertical direction.

5. The nozzle inspection method of claim 1, wherein in the first chemical solution discharge operation, the chemical solution is discharged to a first region of interest of the substrate, and in the second chemical solution discharge operation, the chemical solution is discharged to a second region of interest, different from the first region of interest of the substrate.

6. The nozzle inspection method of claim 5, wherein the inspection operation comprises an imaging operation of moving the substrate to a vision module, and then imaging the pattern for inspection, and an inspection operation of determining whether an image of the imaged pattern for inspection satisfies a preset condition, and in the inspection operation, when any one of the patterns discharged to the first region of interest and the second region of interest satisfies a preset condition, it is determined to be defective.

7. The nozzle inspection method of claim 1, wherein in the first chemical solution discharge operation, the chemical solution is discharged to a first position of the substrate, in the second chemical solution discharge operation, the chemical solution is discharged to a second position of the substrate, different from the first position, and after the first chemical solution discharge operation, at least one of the substrate and the first nozzle is moved in a vertical direction and a horizontal direction.

8. The nozzle inspection method of claim 1, wherein the substrate is a substrate for inspection, the maximum distance is greater than or equal to a distance obtained by adding a difference between the flatness of the printing substrate and maximum flatness of the substrate for inspection to the set distance, and the minimum distance is less than or equal to a distance obtained by subtracting the difference between the flatness of the printing substrate and the maximum flatness of the substrate for inspection from the set distance.

9. A nozzle inspection apparatus, comprising:

a stage on which a substrate is moved;

an inkjet head module disposed on the stage, and including a first nozzle for discharging a chemical solution onto the substrate to form a pattern for inspection;

a vision module disposed on the stage, and imaging the pattern for inspection; and a control module connected to the stage, the inkjet head module, and the vision module, forming the pattern for inspection, and determining whether the first nozzle is defective based on the imaging result, wherein the control module controls the stage and the inkjet head module so that the pattern for inspection includes a pattern of the chemical solution discharged in a first state in which a distance between the substrate and the first nozzle is a first distance and in a second state in which a distance between the substrate and the first nozzle is a second distance that is different from the first distance, wherein the control module controls the stage and the inkjet head module so that the pattern for inspection includes a pattern discharged in a third state in which a distance between the substrate and the first nozzle is a third distance that is different from the first distance and the second distance, wherein the substrate is a substrate for inspection, and wherein one of the first to third distances corresponds to a set distance between a printing substrate and the first nozzle, the other one of the first to third distances corresponds to a maximum distance between the substrate and the first nozzle in consideration of flatness of the printing substrate, and the remaining one of the first to third distances corresponds to a minimum distance between the printing substrate and the first nozzle.

10. The nozzle inspection apparatus of claim 9, wherein the control module discharges the chemical solution through the first nozzle of the inkjet head module while moving the substrate on the stage in a vertical direction.

11. The nozzle inspection apparatus of claim 9, wherein the control module discharges the chemical solution through the first nozzle while also moving the first nozzle in the vertical direction.

12. The nozzle inspection apparatus of claim 9, wherein the control module discharges the chemical solution in the first state to a first position of the substrate, and subsequently discharges the chemical solution in the second state to a second position, different from the first position, to form the pattern for inspection.

13. The nozzle inspection apparatus of claim 12, wherein the inkjet head module further comprises a second nozzle, and when the control module discharges the chemical solution through the first nozzle, and also discharges the chemical solution through the second nozzle, so that the pattern for inspection includes a first chemical solution pattern discharged from the first nozzle and a second chemical solution pattern discharged from the second nozzle.

14. The nozzle inspection apparatus of claim 11, wherein the first distance and the second distance fall within a range below a maximum distance and above a minimum distance between the substrate and the first nozzle or the substrate and the second nozzle, considering a height difference between the first nozzle and the second nozzle.

15. A substrate processing device, comprising:

a first stage disposed in a first region, a printing region;

a second stage disposed in a second region, an inspection region;

one or more gantries disposed to move the first and second stages;

an inkjet head module installed on the gantry and to which a first nozzle and a second nozzle discharging a chemical solution are connected;

a vision module installed on the gantry; and a control module connected to the first and second stages, the gantry, the inkjet head module, and the vision module, wherein the control module forms a pattern for inspection by discharging the chemical solution while changing a distance between the first nozzle and a substrate for inspection in the inspection region, the vision module images a pattern for inspection, wherein the control module controls the first stage and the inkjet head module so that the pattern for inspection includes a pattern of the chemical solution discharged in a first state in which a distance between the substrate and the first nozzle is a first distance and in a second state in which a distance between the substrate and the first nozzle is a second distance that is different from the first distance, wherein the control module controls the first stage and the inkjet head module so that the pattern for inspection includes a pattern discharged in a third state in which a distance between the substrate and the first nozzle is a third distance that is different from the first distance and the second distance, wherein the substrate is a substrate for inspection, and wherein one of the first to third distances corresponds to a set distance between a printing substrate and the first nozzle, the other one of the first to third distances corresponds to a maximum distance between the substrate and the first nozzle in consideration of flatness of the printing substrate, and the remaining one of the first to third distances corresponds to a minimum distance between the printing substrate and the first nozzle.

16. The substrate processing device of claim 15, wherein the gantry comprises a first gantry to which the inkjet head module is connected and a second gantry to which the vision module is connected.

* * * * *